United States Patent
Shigemasa et al.

(10) Patent No.: US 12,288,985 B2
(45) Date of Patent: Apr. 29, 2025

(54) POWER CONVERSION DEVICE, CONTROL DEVICE, AND DISTRIBUTED POWER SOURCE SYSTEM

(71) Applicant: TOSHIBA MITSUBISHI-ELECTRIC INDUSTRIAL SYSTEMS CORPORATION, Tokyo (JP)

(72) Inventors: Takashi Shigemasa, Tokyo (JP); Hiroyuki Koura, Tokyo (JP)

(73) Assignee: TMEIC CORPORATION, Tokyo (JP)

(*) Notice: Subject to any disclaimer, the term of this patent is extended or adjusted under 35 U.S.C. 154(b) by 0 days.

(21) Appl. No.: 18/556,112

(22) PCT Filed: Mar. 3, 2022

(86) PCT No.: PCT/JP2022/009200
§ 371 (c)(1),
(2) Date: Oct. 19, 2023

(87) PCT Pub. No.: WO2023/166676
PCT Pub. Date: Sep. 7, 2023

(65) Prior Publication Data
US 2024/0213775 A1    Jun. 27, 2024

(51) Int. Cl.
*H02J 3/01* (2006.01)
*H02J 3/16* (2006.01)
*H02J 3/38* (2006.01)

(52) U.S. Cl.
CPC .............. *H02J 3/01* (2013.01); *H02J 3/16* (2013.01); *H02J 3/38* (2013.01); *H02J 2300/24* (2020.01)

(58) Field of Classification Search
CPC ........ H02J 3/01; H02J 3/16; H02J 3/38; H02J 2300/24
See application file for complete search history.

(56) References Cited

U.S. PATENT DOCUMENTS

| | | | |
|---|---|---|---|
| 2017/0346389 A1* | 11/2017 | Lung | H02M 7/5387 |
| 2019/0288611 A1* | 9/2019 | Li | H02M 1/126 |
| 2022/0374060 A1* | 11/2022 | Krishnamurthy | H02M 1/0019 |

FOREIGN PATENT DOCUMENTS

| | | |
|---|---|---|
| EP | 4007107 A1 | 6/2022 |
| JP | 2017-034739 A | 2/2017 |

(Continued)

OTHER PUBLICATIONS

International Search Report and Written Opinion mailed on May 17, 2022, received for PCT Application PCT/JP2022/009200, filed on Mar. 3, 2022, 12 pages including English Translation.

*Primary Examiner* — Jared Fureman
*Assistant Examiner* — Esayas G Yeshaw
(74) *Attorney, Agent, or Firm* — XSENSUS LLP

(57) ABSTRACT

A power conversion device includes a major circuit part converting a power of a distributed power source into AC power corresponding to a power system, and a controller controlling an operation of the major circuit part; the controller includes an estimated value calculation part and a reactive power calculation part; the estimated value calculation part calculates an estimated value of a resistance component of a system impedance of the power system, an estimated value of a reactance component of the system impedance, and an estimated value of a voltage value of the infinite bus power system based on an active power value of a connection point to the power system, a reactive power value of the connection point, and a voltage value of the connection point.

5 Claims, 7 Drawing Sheets

(56) References Cited

FOREIGN PATENT DOCUMENTS

| JP | 2017-046408 A | 3/2017 |
| JP | 2017-063525 A | 3/2017 |
| WO | 2021/014581 A1 | 1/2021 |

* cited by examiner

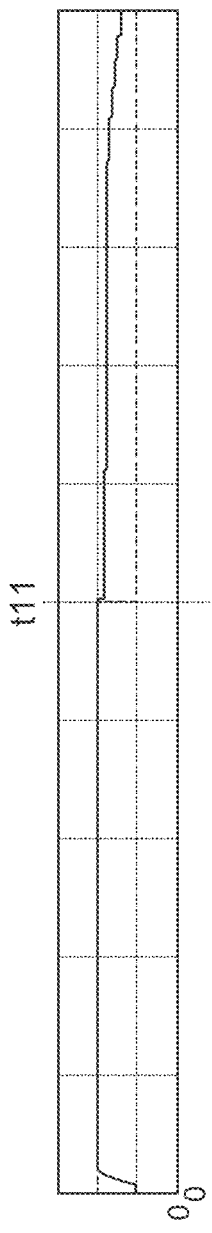
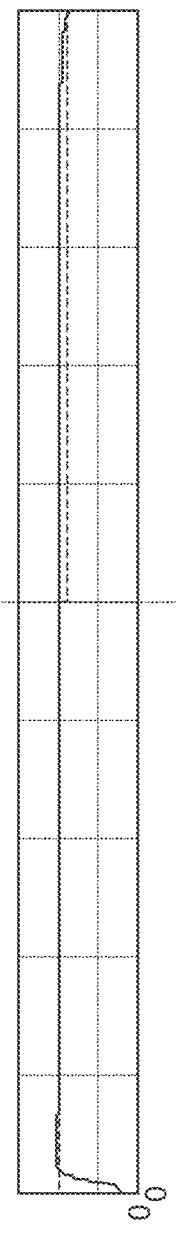
FIG. 6A
FIG. 6B
FIG. 6C
FIG. 6D ly to a power
POWER CONVERSION DEVICE, CONTROL DEVICE, AND DISTRIBUTED POWER SOURCE SYSTEM

CROSS-REFERENCE TO RELATED APPLICATION

The present application is based on PCT filing PCT/JP2022/009200, filed Mar. 3, 2022, the entire contents of which are incorporated herein by reference.

FIELD

Embodiments described herein relate generally to a power conversion device, a control device, and a distributed power source system.

BACKGROUND ART

In a distributed power source system using a distributed power source such as a solar power generator, a wind power generator, a battery, and the like connected to a power system, reactive power is supplied from the distributed power source to the connection point to compensate the voltage fluctuation part of the connection point of the distributed power source. The supply of the reactive power is controlled by a power conversion device converting the power of the distributed power source into power corresponding to the power system. The distributed power source system also may include a control device that controls the operation of the power conversion device.

For example, the use of a Kalman filter applicable to a nonlinear equation to estimate apparent system characteristics when viewed from the connection point of the distributed power source and supply reactive power based on the estimation result is being investigated. The reactive power that corresponds to the system impedance and the like can be supplied thereby, and the fluctuation of the voltage can be suppressed even when the system impedance is large, etc.

However, there are cases where a large change of the system characteristics occurs abruptly due to, for example, rerouting due to circuit breakers being switched on and off in the power grid, tripping of directly proximate loads and/or power supplies, etc. When such an abrupt and large change of the system characteristics occurs, it may take an undesirably long time to appropriately estimate the system characteristics after the change if the system characteristics are estimated using a Kalman filter applicable to a nonlinear equation. Thus, when it takes an undesirably long time to appropriately estimate the system characteristics after the change, there is an undesirable risk that the voltage of the connection point may deviate from a prescribed allowable voltage range for a relatively long time.

It is therefore desirable for the power conversion device, the control device that controls the operation of the power conversion device, and the distributed power source system that uses these devices to be able to more appropriately estimate the system characteristics and more appropriately suppress the voltage fluctuation of the connection point of the distributed power source, even when large changes of the system characteristics occur abruptly.

PRIOR ART DOCUMENTS

Patent Documents

[Patent Document 1]
  JP-A-2017-63525

SUMMARY OF INVENTION

Problem to be Solved by the Invention

Embodiments of the invention provide a power conversion device, a control device, and a distributed power source system that can more appropriately estimate system characteristics even when a large change of the system characteristics occurs abruptly, and can more appropriately suppress voltage fluctuation of a connection point of the distributed power source.

Means for Solving the Problem

According to embodiments of the invention, there is provided a power conversion device connecting a distributed power source to a power system by converting power of the distributed power source into AC power corresponding to the power system and by supplying the AC power after the converting to the power system, the power system being connected to an infinite bus power system, wherein: the power conversion device includes a major circuit part converting the power of the distributed power source into the AC power corresponding to the power system, and a controller controlling an operation of the major circuit part; the controller includes an estimated value calculation part, a reactive power calculation part, and a drive circuit; the estimated value calculation part calculates an estimated value of a resistance component of a system impedance of the power system, an estimated value of a reactance component of the system impedance, and an estimated value of a voltage value of the infinite bus power system based on an active power value of a connection point to the power system, a reactive power value of the connection point, and a voltage value of the connection point; the reactive power calculation part calculates a reactive power command value of reactive power supplied to the power system based on the estimated value of the resistance component of the system impedance, the estimated value of the reactance component of the system impedance, and the estimated value of the voltage value of the infinite bus power system; the drive circuit drives the major circuit part to output a prescribed active power and reactive power corresponding to the reactive power command value; the estimated value calculation part includes a first estimation part, a second estimation part, and a switching part; the first estimation part calculates the estimated value of the resistance component, the estimated value of the reactance component, and the estimated value of the voltage value based on the active power value, the reactive power value, and the voltage value by using a Kalman filter applicable to a nonlinear equation, and calculates an absolute value of a prediction error of the voltage value of the connection point; the second estimation part calculates the estimated value of the resistance component, the estimated value of the reactance component, and the estimated value of the voltage value based on the active power value, the reactive power value, and the voltage value by using Newton's method; the switching part selectively switches one of a calculation result of the first estimation part or a calculation result of the second estimation part and inputs the one to the reactive power calculation part; the switching part switches a state in which the calculation result of the first estimation part is input to the reactive power calculation part to a state in which the calculation result of the second estimation part is input to the reactive power calculation part when the absolute value of the prediction error reaches or exceeds a prescribed threshold, and switches the state in which the calculation result of the second estimation part is input to the reactive power calculation part to the state in which the calculation result of the first estimation part is input to the reactive power calculation part when the calculation of the second estimation part by Newton's method converges; and the first estimation part uses the calculation result of the second estimation part as an estimation initial value when starting the calculation of the estimated value of the resistance component, the estimated value of the reactance component, and the estimated value of the voltage value.

Effects of the Invention

According to embodiments of the invention, a power conversion device, a control device, and a distributed power source system are provided that can more appropriately estimate system characteristics even when a large change of the system characteristics occurs abruptly, and can more appropriately suppress voltage fluctuation of a connection point of the distributed power source.

BRIEF DESCRIPTION OF DRAWINGS

FIGS. 6A to 6D are graphs schematically illustrating an example of a reference operation of the power conversion device.

DESCRIPTION OF EMBODIMENTS

Figure 1:
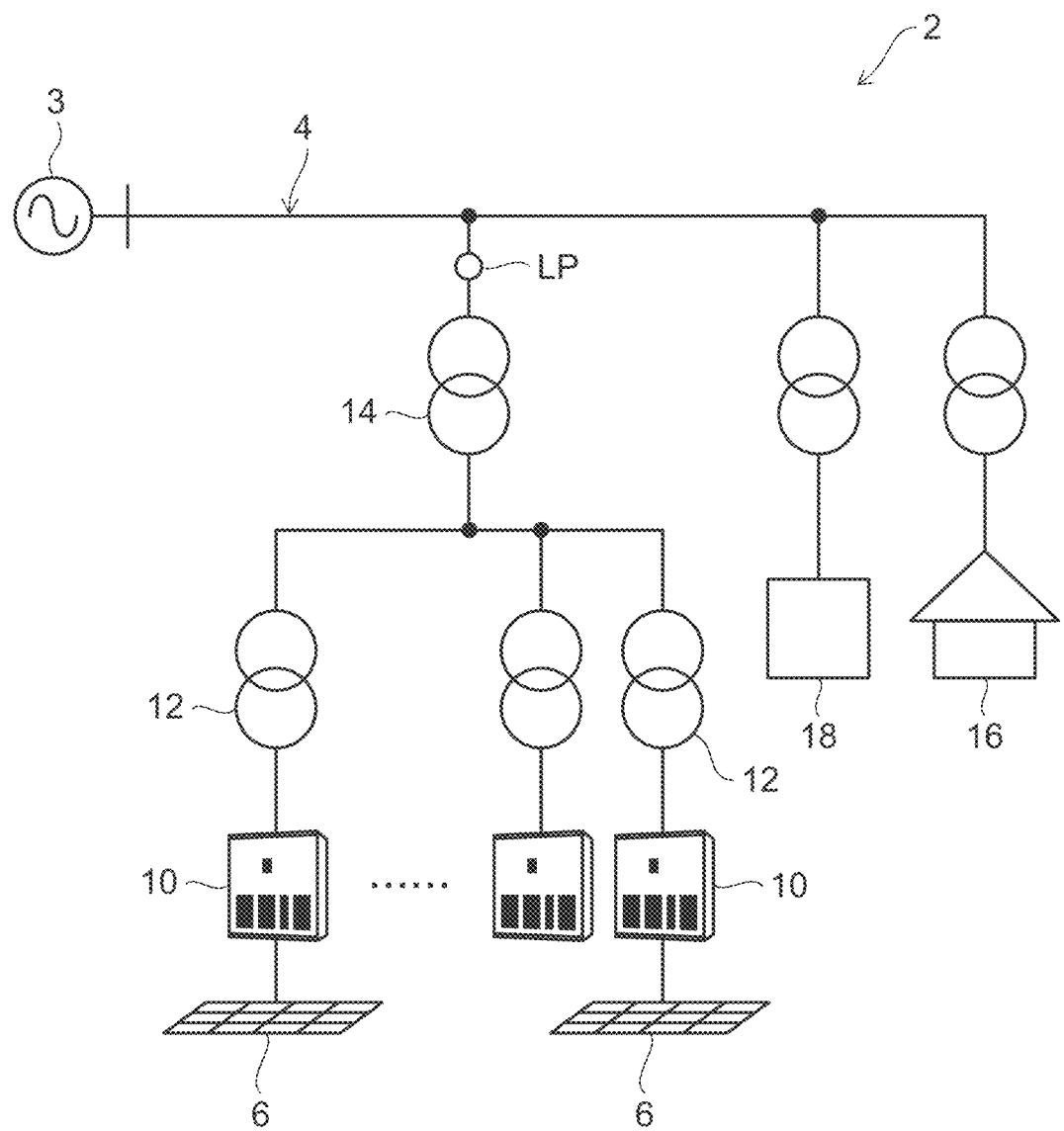
FIG. 1 is a block diagram schematically illustrating a distributed power source system according to an embodiment.

Embodiments will now be described with reference to the drawings.

The drawings are schematic and conceptual; and the relationships between the thicknesses and widths of portions, the proportions of sizes among portions, etc., are not necessarily the same as the actual values. Also, the dimensions and proportions may be illustrated differently among drawings, even for identical portions.

In the specification and drawings, components similar to those described previously or illustrated in an antecedent drawing are marked with the same reference numerals; and a detailed description is omitted as appropriate.

FIG. 1 is a block diagram schematically illustrating a distributed power source system according to an embodiment.

As illustrated in FIG. 1, the distributed power source system 2 includes a power conversion device 10, a distributed power source 6, and a power system 4 that is connected to an infinite bus power system 3. The power of the power system 4 is AC power. The power of the power system 4 is, for example, three-phase AC power.

The distributed power source 6 is, for example, a solar panel. The power of the distributed power source 6 is DC power. The power conversion device 10 is connected with the distributed power source 6, and is connected with the power system 4 via transformers 12 and 14, etc. The power conversion device 10 connects the distributed power source 6 to the power system 4 by converting the DC power of the distributed power source 6 into AC power corresponding to the power system 4 and by supplying the AC power after the conversion to the power system 4.

The distributed power source 6 is not limited to a solar panel and may be, for example, another generator such as a wind power generator, a gas turbine generator, etc. Also, the distributed power source 6 may be, for example, a power storage device that uses a storage battery, a capacitor, etc. The power of the distributed power source 6 is not limited to DC power and may be AC power, etc. The configuration of the power conversion device 10 may be any configuration that can convert the power supplied from the distributed power source 6 into AC power corresponding to the power system 4.

Other than the distributed power source 6 and the power conversion device 10, for example, there is a possibility that a consumer 16 (a load), another generator 18, etc., may be connected directly nearby in the power system 4. Based on the output of the distributed power source 6, the power conversion device 10 supplies active power to the power system 4 and supplies the optimal reactive power to the power system 4. As a result, the power conversion device 10 suppresses the undesirable fluctuation of the voltage of a connection point LP to the power system 4 due to its own supply of the active power and the effects of the consumer 16 and/or the generator 18.

The distributed power source system 2 includes, for example, multiple distributed power sources 6, and multiple power conversion devices 10 corresponding respectively to the multiple distributed power sources 6. However, the number of the distributed power sources 6 and the number of the power conversion devices 10 provided in the distributed power source system 2 may be any number. The number of the distributed power sources 6 and the number of the power conversion devices 10 may be one. Also, the number of the power conversion devices 10 may not always be equal to the number of the distributed power sources 6. For example, multiple distributed power sources 6 may be connected to one power conversion device 10.

Figure 2:
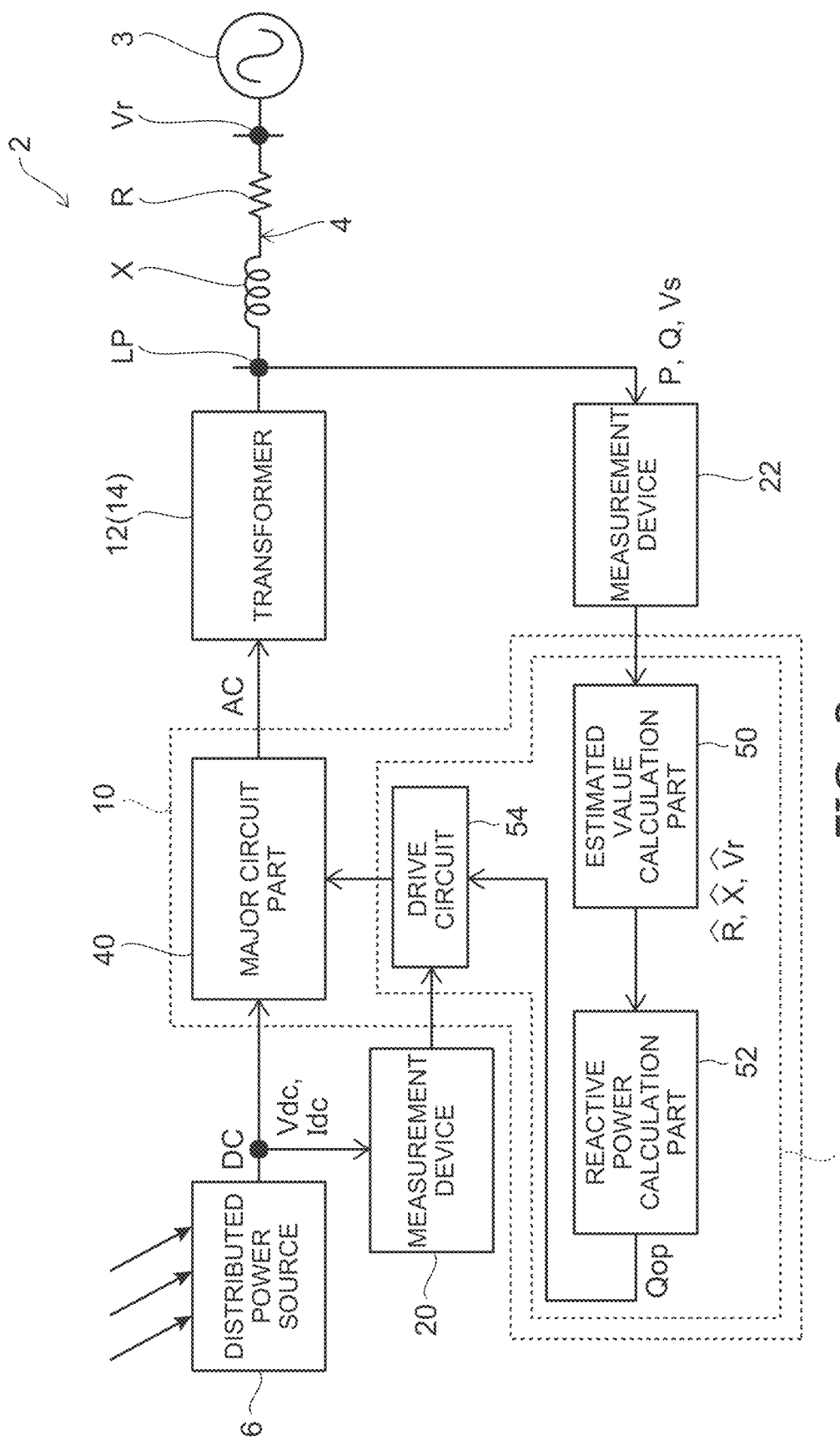
FIG. 2 is a block diagram schematically illustrating the power conversion device of the distributed power source system according to the embodiment.

FIG. 2 is a block diagram schematically illustrating the power conversion device of the distributed power source system according to the embodiment.

As illustrated in FIG. 2, the power conversion device 10 includes a major circuit part 40 and a controller 42. The major circuit part 40 converts the DC power or AC power supplied from the distributed power source 6 into the AC power corresponding to the power system 4. The controller 42 controls the operation of the major circuit part 40.

The major circuit part 40 includes, for example, multiple switching elements and converts the power by the on/off of the multiple switching elements. The controller 42 controls the conversion of the power by the major circuit part 40 by controlling the on/off switching of the multiple switching elements of the major circuit part 40. The major circuit part 40 includes, for example, a well-known inverter circuit. The configuration of the major circuit part 40 may be any configuration that can perform the power conversion described above.

The distributed power source system 2 further includes, for example, measurement devices 20 and 22. The measurement device 20 detects a voltage value Vdc of the DC voltage input from the distributed power source 6 to the power conversion device 10 and a current value Idc of the direct current input from the distributed power source 6 to the power conversion device 10, and inputs the detected voltage value Vdc and the detected current value Idc to the controller 42.

For example, the controller 42 performs a control using the MPPT (Maximum Power Point Tracking) technique in which the DC power is caused to track the maximum power point of the distributed power source 6. For example, based on the voltage value Vdc and the current value Idc detected by the measurement device 20, the controller 42 extracts the maximum power point (the optimal operating point) of the distributed power source 6 and controls the operation of the major circuit part 40 to supply, to the power system 4, active power corresponding to the extracted maximum power point.

However, the method for determining the active power supplied from the power conversion device 10 to the power system 4 is not limited to the MPPT technique. The active power that is supplied from the power conversion device 10 to the power system 4 may be determined, for example, based on an active power command value input from a higher-level controller, etc. The controller 42 may control the operation of the major circuit part 40 to supply, to the power system 4, active power corresponding to the input active power command value.

The measurement device 22 detects an active power value P of the connection point LP to the power system 4 of the power conversion device 10, a reactive power value Q of the connection point LP, and a voltage value Vs of the connection point LP, and inputs the detected active power value P, the detected reactive power value Q, and the detected voltage value Vs to the controller 42.

The controller 42 includes an estimated value calculation part 50, a reactive power calculation part 52, and a drive circuit 54. The controller 42 inputs, to the estimated value calculation part 50, the active power value P, the reactive power value Q, and the voltage value Vs input from the measurement device 22.

Based on the active power value P, the reactive power value Q, and the voltage value Vs input from the measurement device 22, the estimated value calculation part 50 calculates an estimated value $\hat{R}$ of a resistance component R of the system impedance of the power system 4, an estimated value $\hat{X}$ of a reactance component X of the system impedance of the power system 4, and an estimated value $\hat{V}r$ of a voltage value Vr of the infinite bus power system 3. ^(hat) which represents the estimated values such as ^R and the like is the notation directly above R and the like as illustrated in FIG. 2, etc., but is shifted in the notation as in ^R to accommodate the formatting in the specification.

In other words, the estimated value calculation part 50 estimates the system characteristics of the power system 4 based on the active power value P, the reactive power value Q, and the voltage value Vs. In this case, the estimated value calculation part 50 considers the system model of the power system 4 to be the simplest system model of only the resistance component R and the reactance component X of the system impedance as illustrated in FIG. 2. The estimated value calculation part 50 inputs the calculated estimated values ^R, ^X, and ^Vr to the reactive power calculation part 52.

The reactive power calculation part 52 calculates a reactive power command value $Q_{op}$ of the reactive power supplied to the power system 4 based on the estimated values ^R, ^X, and ^Vr input from the estimated value calculation part 50. The reactive power calculation part 52 inputs the calculated reactive power command value $Q_{op}$ to the drive circuit 54.

The reactive power calculation part 52 calculates the reactive power command value $Q_{op}$ from the estimated values ^R, ^X, and ^Vr by using, for example, the following Formula (1). The reactive power calculation part 52 calculates the optimal reactive power command value $Q_{op}$ based on the estimated values ^R, ^X, and ^Vr and the active power value P. In Formula (1), "sign" is the sign function.

[Formula 1]

$$Q_{op} = \frac{\hat{X}\hat{V}_r^2}{\hat{R}^2 + \hat{X}^2} - \text{sign}(\hat{X})\sqrt{\left(\frac{\hat{X}\hat{V}_r^2}{\hat{R}^2 + \hat{X}^2}\right)^2 - P^2 + 2P\frac{\hat{R}\hat{V}_r^2}{\hat{R}^2 + \hat{X}^2}} \quad (1)$$

The reactive power command value $Q_{op}$ that is calculated by the reactive power calculation part 52 is input to the drive circuit 54; and the voltage value Vdc and the current value Idc of the distributed power source 6 measured by the measurement device 20 are input to the drive circuit 54.

The drive circuit 54 determines the active power by a control using the MPPT technique based on the voltage value Vdc and the current value Idc, and drives the major circuit part 40 to output the determined active power and reactive power corresponding to the reactive power command value $Q_{op}$. The drive circuit 54 supplies the determined active power and the reactive power corresponding to the reactive power command value $Q_{op}$ from the major circuit part 40 to the power system 4 by switching the multiple switching elements of the major circuit part 40 on/off.

The measurement device 22 and the estimated value calculation part 50 regularly acquire the active power value P, the reactive power value Q, and the voltage value Vs. Each time the active power value P, the reactive power value Q, and the voltage value Vs are acquired, the estimated value calculation part 50 calculates (predicts) the estimated values ^R, ^X, and ^Vr and updates the current state from the predicted state and the information due to observation.

The reactive power calculation part 52 calculates the reactive power command value $Q_{op}$ each time the estimated values ^R, ^X, and ^Vr are input from the estimated value calculation part 50. Each time the reactive power command value $Q_{op}$ is input, the drive circuit 54 generates a control signal of the major circuit part 40 and supplies the active power and the reactive power from the major circuit part 40 to the power system 4. By repeating the processing described above, the controller 42 dynamically supplies, to the power system 4, the active power corresponding to the distributed power source 6 and the reactive power corresponding to the system characteristics of the power system 4.

Thus, by supplying the active power and the reactive power to the power system 4, the fluctuation of the voltage of the connection point LP due to the supply of the active power from the power conversion device 10 to the power system 4 and/or the effects of the consumer 16, the generator 18, etc., can be suppressed. For example, the fluctuation of the voltage value Vs of the connection point LP can be suppressed to be within ±2%.

Figure 3:
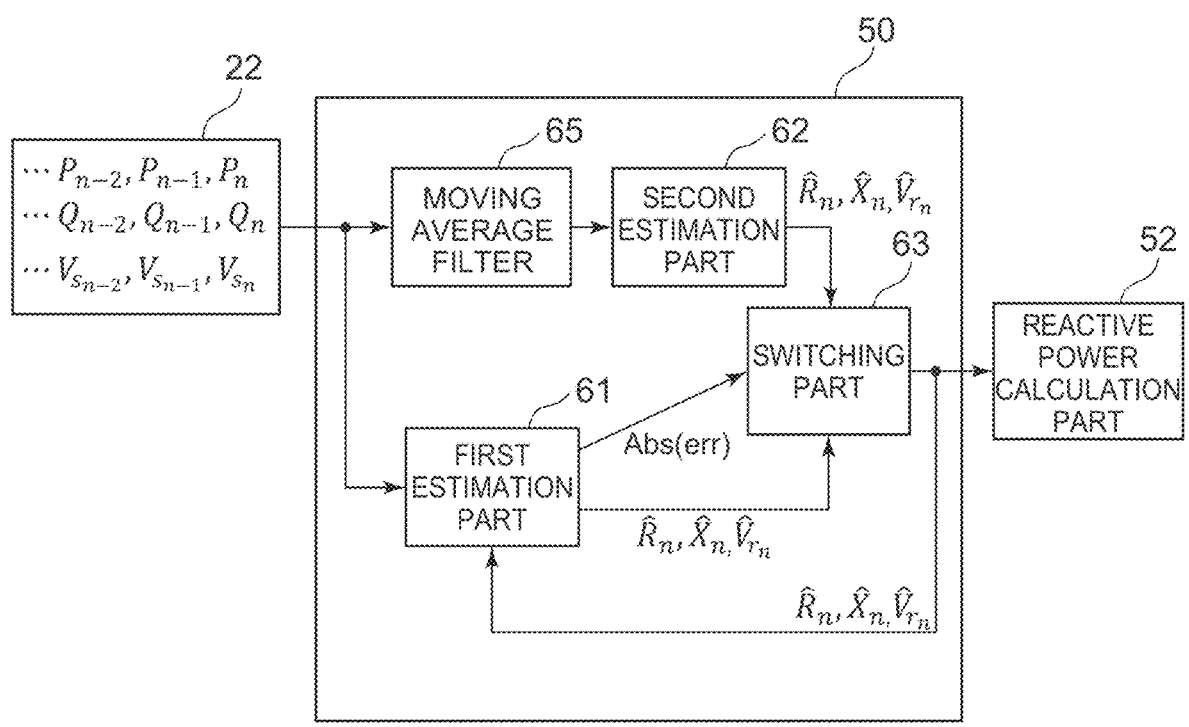
FIG. 3 is a block diagram schematically illustrating the estimated value calculation part according to the embodiment.

FIG. 3 is a block diagram schematically illustrating the estimated value calculation part according to the embodiment.

As illustrated in FIG. 3, the estimated value calculation part 50 includes a first estimation part 61, a second estimation part 62, and a switching part 63. The estimated value calculation part 50 inputs the measured values of the active power value P, the reactive power value Q, and the voltage value Vs input from the measurement device 22 to the first estimation part 61 and to the second estimation part 62.

The first estimation part 61 uses a Kalman filter applicable to a nonlinear equation to calculate the estimated values ^R, ^X, and ^Vr from the active power value P, the reactive power value Q, and the voltage value Vs that are input. More specifically, the first estimation part 61 calculates the estimated values ^R, ^X, and ^Vr from the active power value P, the reactive power value Q, and the voltage value Vs by using an extended Kalman filter. The first estimation part 61 inputs the calculated estimated values ^R, ^X, and ^Vr to the switching part 63. The Kalman filter that is applicable to a nonlinear equation is not limited to an extended Kalman filter and may be, for example, an unscented Kalman filter, an ensemble Kalman filter, etc. However, compared to such filters, the calculation load of the first estimation part 61 (the estimated value calculation part 50) can be reduced by using an extended Kalman filter.

The second estimation part 62 uses Newton's method to calculate the estimated values ^R, ^X, and ^Vr from the active power value P, the reactive power value Q, and the voltage value Vs that are input. The second estimation part 62 inputs the calculated estimated values ^R, ^X, and ^Vrto the switching part 63.

The estimated value calculation part 50 further includes, for example, a moving average filter 65. The moving average filter 65 calculates moving averages of the active power value P, the reactive power value Q, and the voltage value Vs input from the measurement device 22 and inputs the active power value P, the reactive power value Q, and the voltage value Vs after the calculation to the second estimation part 62.

For example, the second estimation part 62 calculates the estimated values ^R, ^X, and ^Vr based on the active power value P, the reactive power value Q, and the voltage value Vs input from the moving average filter 65. In other words, the second estimation part 62 calculates the estimated values ^R, ^X, and ^Vr based on the moving average values of the active power value P, the reactive power value Q, and the voltage value Vs.

Thus, for example, the effects of noise superimposed onto the active power value P, the reactive power value Q, and the voltage value Vs can be suppressed by providing the moving average filter 65, using the active power value P, the reactive power value Q, and the voltage value Vs after the calculation of the moving averages, and calculating the estimated values ^R, ^X, and ^Vr by using Newton's method. For example, the accuracy of the estimation of the estimated values ^R, ^X, and ^Vr by the second estimation part 62 can be further increased thereby.

However, the moving average filter 65 is provided as necessary and is omissible. The estimated value calculation part 50 may calculate the estimated values ^R, ^X, and ^Vr based on the active power value P, the reactive power value Q, and the voltage value Vs input from the measurement device 22.

The switching part 63 selectively switches one of the calculation result of the first estimation part 61 or the calculation result of the second estimation part 62 and inputs the one to the reactive power calculation part 52. In other words, the switching part 63 selectively switches one of the estimated values ^R, ^X, and ^Vr input from the first estimation part 61 or the estimated values ^R, ^X, and ^Vr input from the second estimation part 62 and inputs the one to the reactive power calculation part 52. As a result, one of the estimated values ^R, ^X, and ^Vr calculated by the first estimation part 61 or the estimated values ^R, ^X, and ^Vr calculated by the second estimation part 62 is input to the reactive power calculation part 52.

The first estimation part 61 calculates the estimated values ^R, ^X, and ^Vr by using a Kalman filter applicable to a nonlinear equation, and calculates an absolute value Abs (err) of a prediction error err of the voltage value Vs of the connection point LP. The prediction error err of the connection point LP is the difference from the predicted value $h(x_k^f)$ based on the estimated values ^R, ^X, and ^Vr and the measured values of the voltage value Vs, the active power P, and the reactive power Q of the connection point LP.

The switching part 63 inputs the calculation result of the first estimation part 61 to the reactive power calculation part 52 when the absolute value Abs(err) of the prediction error err calculated by the first estimation part 61 is less than a prescribed threshold. Then, the switching part 63 inputs the calculation result of the second estimation part 62 to the reactive power calculation part 52 when the absolute value Abs(err) of the prediction error err calculated by the first estimation part 61 reaches or exceeds the prescribed threshold. In other words, the switching part 63 switches the state in which the calculation result of the first estimation part 61 is input to the reactive power calculation part 52 to the state in which the calculation result of the second estimation part 62 is input to the reactive power calculation part 52 when the absolute value Abs(err) of the prediction error err calculated by the first estimation part 61 reaches or exceeds the prescribed threshold.

After setting the state in which the calculation result of the second estimation part 62 is input to the reactive power calculation part 52, the switching part 63 inputs the calculation result of the first estimation part 61 to the reactive power calculation part 52 when the calculation of the estimated values ^R, ^X, and ^Vr of the second estimation part 62 using Newton's method converges. In other words, the switching part 63 returns the state in which the calculation result of the second estimation part 62 is input to the reactive power calculation part 52 to the state in which the calculation result of the first estimation part 61 is input to the reactive power calculation part 52 when the calculation of the second estimation part 62 converges.

Figure 4:
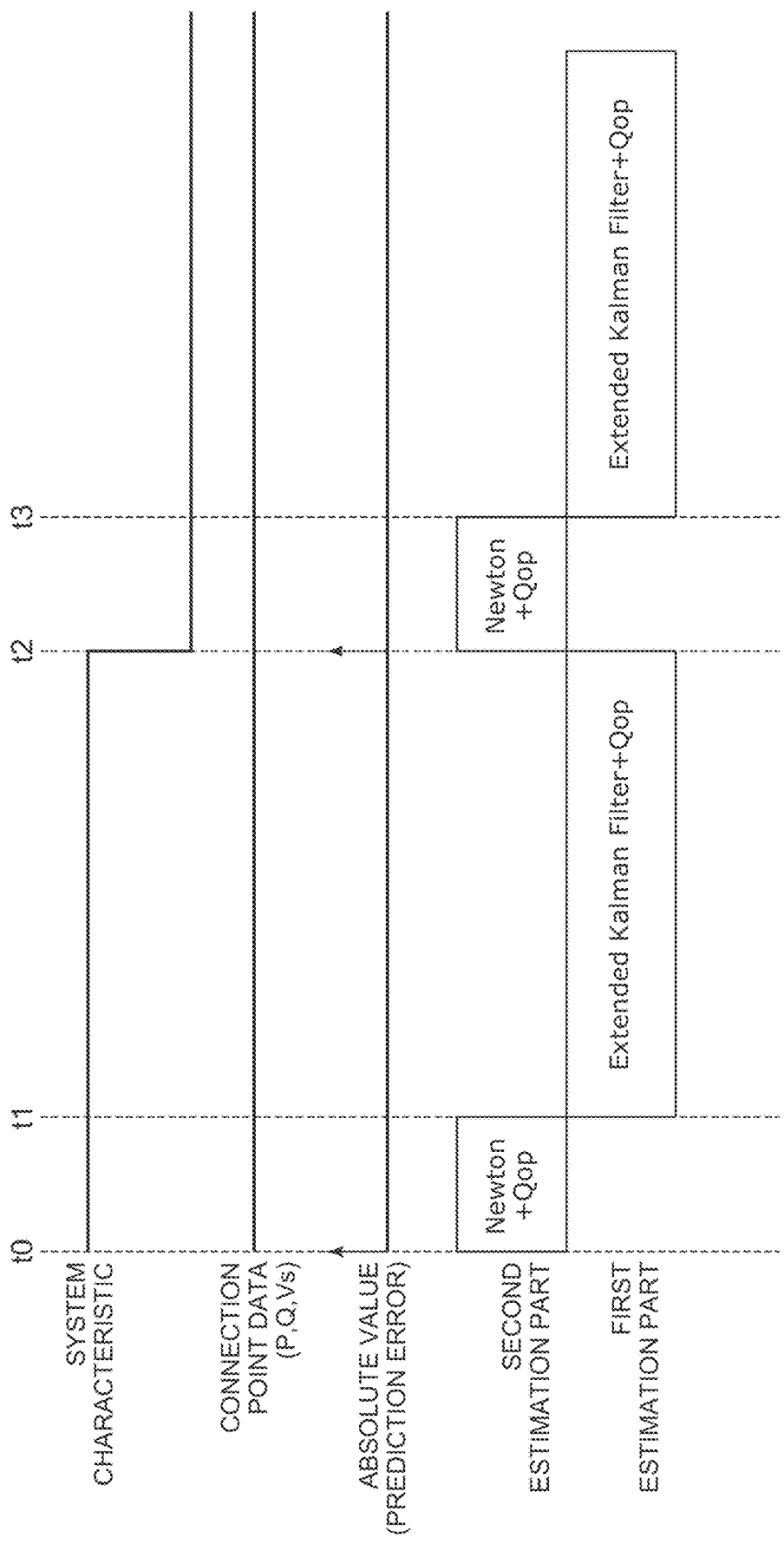
FIG. 4 is a timing chart schematically illustrating an example of an operation of the power conversion device according to the embodiment.

FIG. 4 is a timing chart schematically illustrating an example of an operation of the power conversion device according to the embodiment.

As illustrated in FIG. 4, for example, there is a possibility that the absolute value Abs(err) of the prediction error err calculated by the first estimation part 61 may increase and reach or exceed the prescribed threshold when starting the operation of the power conversion device 10 (a time t0 of FIG. 4). For example, when starting the operation of the power conversion device 10, the switching part 63 inputs the calculation result of the second estimation part 62 to the reactive power calculation part 52 when the absolute value Abs(err) of the prediction error err is not less than the threshold. When starting the operation of the power conversion device 10, the estimated value calculation part 50 may operate the second estimation part 62 and input the calculation result of the second estimation part 62 to the reactive power calculation part 52 without calculating the absolute value Abs(err) of the prediction error err.

As illustrated in FIG. 4, the first estimation part 61 stops calculating the estimated values ^R, ^X, and ^Vr when the second estimation part 62 calculates the estimated values ^R, ^X, and ^Vr. In contrast, the second estimation part 62 stops calculating the estimated values ^R, ^X, and ^Vr when the first estimation part 61 calculates the estimated values ^R, ^X, and ^Vr. For example, the calculation load of the estimated value calculation part 50 can be reduced thereby. However, the first estimation part 61 may continuously calculate during the calculation of the second estimation part 62. The second estimation part 62 may continuously calculate during the calculation of the first estimation part 61.

According to the convergence of the calculation of the second estimation part 62, the switching part 63 switches the state in which the calculation result of the second estimation part 62 is input to the reactive power calculation part 52 to the state in which the calculation result of the first estimation part 61 is input to the reactive power calculation part 52 (a time t1 of FIG. 4).

Also, the switching part 63 inputs the calculation result of the second estimation part 62 (the estimated values ^R, ^X, and ^Vr of the convergence calculation) to the first estimation part 61 when switching from the state in which the calculation result of the second estimation part 62 is input to the reactive power calculation part 52 to the state in which the calculation result of the first estimation part 61 is input to the reactive power calculation part 52.

When switching to the state in which the calculation result of the first estimation part 61 is input to the reactive power calculation part 52, the first estimation part 61 uses the calculation result of the second estimation part 62 input via the switching part 63 as an estimation initial value when starting the calculation of the estimated values ^R, ^X, and ^Vr. For example, the calculation result of the second estimation part 62 may be directly input from the second estimation part 62 to the first estimation part 61 without interposing the switching part 63. The method of inputting the calculation result of the second estimation part 62 to the first estimation part 61 may be any method that can appropriately input the calculation result of the second estimation part 62 to the first estimation part 61.

For example, there is a possibility that the absolute value Abs(err) of the prediction error err calculated by the first estimation part 61 may increase and reach or exceed the prescribed threshold when a large change of the system characteristics of the power system 4 occurs abruptly (a time t2 of FIG. 4). There is a possibility that a large change of the system characteristics of the power system 4 may occur abruptly when, for example, the path of the transmission is changed by switching circuit breakers on and off in the power grid, when a directly proximate consumer 16 and/or generator 18 has tripped (becomes disconnected from the power system 4), etc.

The switching part 63 switches the state in which the calculation result of the first estimation part 61 is input to the reactive power calculation part 52 to the state in which the calculation result of the second estimation part 62 is input to the reactive power calculation part 52 when, for example, a large change of the system characteristics of the power system 4 occurs abruptly and the absolute value Abs(err) of the prediction error err reaches or exceeds the threshold (the time t2 of FIG. 4).

Then, when the calculation of the second estimation part 62 converges again, the switching part 63 accordingly switches the state in which the calculation result of the second estimation part 62 is input to the reactive power calculation part 52 to the state in which the calculation result of the first estimation part 61 is input to the reactive power calculation part 52 (a time t3 of FIG. 4). In such a case as well, similarly to the case described above, the first estimation part 61 uses the calculation result of the second estimation part 62 as the estimation initial value.

FIGS. 5A to 5D are graphs schematically illustrating an example of an operation of the power conversion device according to the embodiment.

FIGS. 6A to 6D are graphs schematically illustrating an example of a reference operation of the power conversion device.

Figure 5A:
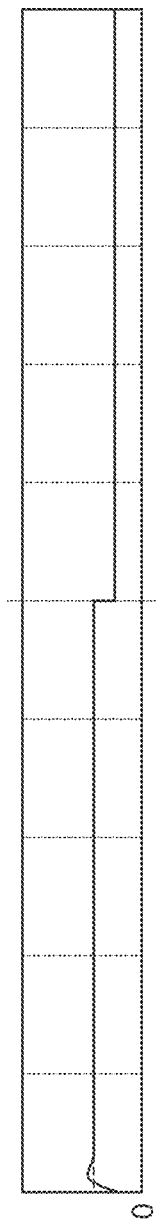
FIGS. 5A to 5D are graphs schematically illustrating an example of an operation of the power conversion device according to the embodiment.

FIG. 5A schematically illustrates an example of the calculation of the estimated value ^R of the resistance component R of the system impedance of the power system 4.

Figure 5B:

FIG. 5B schematically illustrates an example of the calculation of the estimated value ^X of the reactance component X of the system impedance of the power system 4.

Figure 5C:
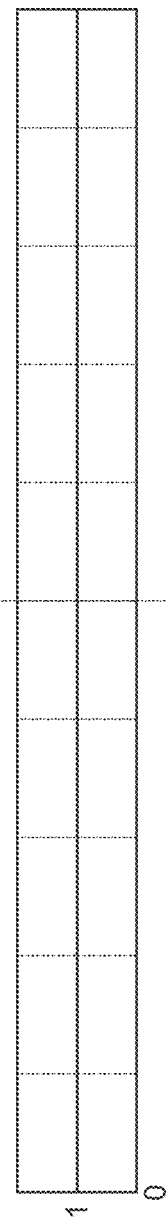

FIG. 5C schematically illustrates an example of the calculation of the estimated value ^Vr of the voltage value Vr of the infinite bus power system 3.

Figure 5D:
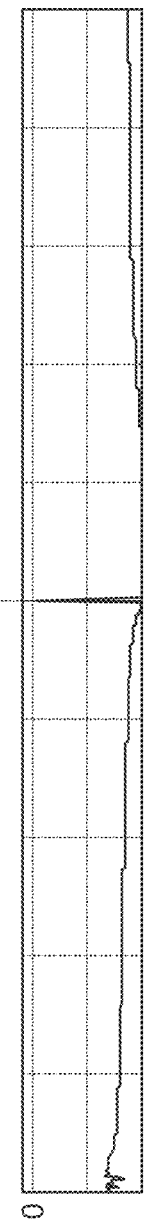

FIG. 5D schematically illustrates an example of the calculation of the absolute value Abs(err) of the prediction error err of the voltage value Vs of the connection point LP.

Also, in FIG. 5A, the solid line illustrates an example of the calculation of the estimated value ^R; and the broken line illustrates the true value of the simulation of the resistance component R.

Similarly, in FIG. 5B, the solid line illustrates an example of the calculation of the estimated value ^X; and the broken line illustrates the true value of the simulation of the reactance component X.

In FIG. 5C, the solid line illustrates an example of the calculation of the estimated value ^Vr; and the broken line illustrates the true value of the simulation of the voltage value Vr.

The content of FIGS. 6A to 6D is similar to the content of FIGS. 5A to 5D; and a description is therefore omitted.

FIGS. 5A to 5D and FIGS. 6A to 6D illustrate examples of calculation results when a large change of the system characteristics of the power system 4 occurs abruptly at a time t11. FIGS. 5A to 5D illustrate an example of the output of the estimated value calculation part 50 when switching to the calculation result of the second estimation part 62 when a large change of the system characteristics occurs abruptly and the absolute value Abs(err) of the prediction error err reaches or exceeds the threshold as described above.

On the other hand, FIGS. 6A to 6D illustrate an example of the reference operation when the calculation by the extended Kalman filter is continued even when the large change of the system characteristics of the power system 4 occurs abruptly. In other words, FIGS. 6A to 6D illustrate an example of a reference operation when only the first estimation part 61 is used.

When the calculation by the extended Kalman filter is continued even when a large change of the system characteristics of the power system 4 occurs abruptly as in the reference example illustrated in FIGS. 6A to 6D, it takes an undesirably long time for the estimated values to approach the true values when an abrupt and large change of the system characteristics occurs. In the reference example illustrated in FIGS. 6A to 6D, it takes an undesirably long time particularly for the estimated value ^R of the resistance component R to approach the true value.

In contrast, in the power conversion device 10 according to the embodiment, even when a large change of the system characteristics of the power system 4 occurs abruptly as illustrated in FIGS. 5A to 5D, compared to the example of FIGS. 6A to 6D, the time is short for the estimated values to approach the true values. In other words, in the power conversion device 10, compared to the configuration of the reference example, the ability of the estimated values to track the true values is improved even when a large change of the system characteristics of the power system 4 occurs abruptly. In FIGS. 5A to 5C, the solid line which is the calculated value substantially overlaps the broken line which is the true value, and the broken line is difficult to see.

The estimation of the values near the system characteristics is relatively fast in the calculation of the estimated values ˆR, ˆX, and ˆVr by using Newton's method; however, when noise is included in the measured values of the active power value P, the reactive power value Q, and the voltage value Vs, it may be undesirably difficult to appropriately estimate the system characteristics of the power system 4 due to susceptibility to the effects of the noise. For example, there is a possibility that the estimated values of the system characteristics of the power system 4 may change due to the effects of the noise, and it may be undesirably difficult to appropriately suppress the voltage fluctuation of the connection point LP.

Therefore, the calculation of the estimated values ˆR, ˆX, and ˆVr by using a Kalman filter applicable to a nonlinear equation was investigated. As a result, it was confirmed that compared to the calculation by using Newton's method, the calculation of the estimated values ˆR, ˆX, and ˆVr by using the Kalman filter applicable to the nonlinear equation can more appropriately estimate the system characteristics of the power system 4 even when noise is included in the measured values.

When, however, a large change of the system characteristics occurs abruptly when calculating by using the Kalman filter applicable to the nonlinear equation, the trackability of the system characteristics after the change undesirably degrades as illustrated in FIGS. 6A to 6D. It is considered that this is because when calculating by using the Kalman filter applicable to the nonlinear equation, the effects of the small Kalman gain and the estimated values of the system characteristics before the change undesirably delay the estimation of the system characteristics after the change.

In contrast, as a result of the investigation, it was confirmed that switching to the calculation using Newton's method when the absolute value Abs(err) of the prediction error err reaches or exceeds the threshold and then passing the calculation result to the calculation using the Kalman filter applicable to the nonlinear equation, the effects of the noise superimposed onto the measured values can be suppressed, and the trackability of the system characteristics after the change can be improved even when a large change of the system characteristics occurs abruptly.

In other words, in the power conversion device 10 according to the embodiment, the initial estimation of the estimated values is performed by a calculation using Newton's method, values near the system characteristics are calculated, and the results are passed to the calculation using the Kalman filter applicable to the nonlinear equation. In other words, the calculation result of the second estimation part 62 is input to the first estimation part 61; and the calculation result of the second estimation part 62 is used as the estimation initial value of the first estimation part 61.

Thereafter, continuous estimation of the estimated values is performed by calculating with the Kalman filter applicable to the nonlinear equation which is resistant to noise.

When the calculation of the Kalman filter applicable to the nonlinear equation is continued even when a large change of the system characteristics occurs abruptly, for example, it may undesirably take not less than 100 sampling points until the estimated values track the system characteristics after the change. For a sampling interval of 5 seconds, it would undesirably take not less than 500 seconds (8 minutes 20 seconds).

In contrast, the calculation by using Newton's method can perform the convergence calculation with three data points after the change. For example, for a sampling interval of 5 seconds, values near the system characteristics can be obtained by performing the convergence calculation in 15 seconds. In the calculation using the Kalman filter applicable to the nonlinear equation, if the values near the system characteristics are obtained, the estimation can be continued with high accuracy by the Kalman filter applicable to the nonlinear equation which is resistant to noise.

Thus, in the power conversion device 10 according to the embodiment, the system characteristics of the power system 4 can be more appropriately estimated and the voltage fluctuation of the connection point LP can be more appropriately suppressed even when a large change of the system characteristics occurs abruptly. In the power conversion device 10 according to the embodiment, by supplying the appropriate reactive power to the connection point LP, the fluctuation of the voltage Vs of the connection point LP can be more appropriately suppressed, the power factor of the output AC power can be improved, and the active power can be more efficiently supplied to the power system 4. For example, the supply amount of the active power from the distributed power source system 2 to the power system 4 can be increased thereby, and a higher increase of the electricity sales income of the business owner of the distributed power source system 2 can be anticipated.

Also, the power conversion device 10 according to the embodiment further includes the moving average filter 65; and the second estimation part 62 calculates the estimated values ˆR, ˆX, and ˆVr based on the moving average values of the active power value P, the reactive power value Q, and the voltage value Vs. As a result, even when calculating with Newton's method, the effects of the noise superimposed onto the measured values can be suppressed, and the accuracy of the estimation of the estimated values ˆR, ˆX, and ˆVr can be further increased.

In such a case, it is favorable for the data length (the number of averaged measured values) of the moving average filter 65 to be about several points. The data length of the moving average filter 65 is, for example, not less than about three points and not more than about ten points. The undesirable lag of the trackability of the system characteristics due to the average of the moving average filter 65 can be suppressed thereby.

The calculation of the estimated values ˆR, ˆX, and ˆVr by the first estimation part 61 using an extended Kalman filter will now be described.

The voltage value Vs of the connection point LP can be represented by the nonlinear equation of the following Formula (2). The estimated values ˆR, ˆX, and ˆVr are calculated by applying the extended Kalman filter based on the nonlinear equation.

[Formula 2]
$$V_S = \sqrt{\frac{2(P\hat{R}+Q\hat{X})+\hat{V}_r^2 + \sqrt{\left(2(P\hat{R}+Q\hat{X})+\hat{V}_r^2\right)^2 - 4(P^2+Q^2)(\hat{R}^2+\hat{X}^2)}}{2}} \quad (2)$$

The state equation of the extended Kalman filter can be represented by the following Formula (3). Also, the output equation of the extended Kalman filter can be represented by the following Formula (4).

[Formula 3]
$$x_k = f(x_{k-1}) + w_{k-1} \quad (3)$$

[Formula 4]
$$z_k = h(x_k) + v_k \quad (4)$$

In Formula (3), x is a state vector having, as components, the resistance component R and the reactance component X of the system impedance of the power system 4 and the voltage value Vr of the infinite bus power system 3 as represented in the following Formula (5). It is noted that "T" represents the transpose in Formula (5).

[Formula 5]
$$x = [R, X, V_r]^T \quad (5)$$

In Formula (3), f is function $f(x_{k-1})=x_{k-1}$ of the state vector x. In Formula (3), w is a vector of the system noise. Also, in Formulas (3) and (4), the index "k" represents time. In other words, the index "k" is the order of the data corresponding to the active power value P, the reactive power value Q, and the voltage value Vs that is regularly acquired. "k−1" represents the data one before "k". Accordingly, Formula (3) illustrates the estimation of the current state vector x from the state vector x one previous. The index "k" is similar in the following formulas as well.

In Formula (4), z is the observed value of the voltage value Vs. In Formula (4), h is a nonlinear function of x. Also, in Formula (4), v is the observation noise. Formula (4) represents the effects of the observed value z on the state vector x. In the example, h(x) is the predicted voltage value Vs of the connection point LP (h(x)=Vs). In other words, the observed value z can be considered to be the observation noise v added to the voltage value Vs of the connection point LP. The observed value z is the measured value of the voltage value Vs from the measurement device 22.

The extended Kalman filter includes a predict step and an update step. In the predict step, the first estimation part 61 predicts the state vector x using the following Formula (6).

[Formula 6]
$$x_k^f = f(x_{k-1}^a) = x_{k-1}^a \quad (6)$$

In Formula (6), $x^f$ represents the predicted value of the state vector x. $x^a$ represents the state vector x updated in the update step. Thus, in the example, the state vector $x^a$ after the update is used as the state vector $x^f$ after the prediction.

The first estimation part 61 calculates the components of the state vector $x^f$ after the prediction respectively as the estimated values ^R, ^X, and ^Vr. In other words, the estimated values ^R, ^X, and ^Vr are the components of the state vector $x^a$ after the update. Also, the first estimation part 61 includes an initial value of the state vector x and uses the initial value as the state vector $x^f$ after the prediction in an initial state in which the update step is not performed. Based on the estimated values ^R, ^X, and ^Vr thus calculated, the controller 42 controls the operation of the major circuit part 40 as described above.

As described above, when calculating with the second estimation part 62, the calculation result of the second estimation part 62 is used as the initial value of the state vector x. When the calculation by the second estimation part 62 is not performed (e.g., when starting the operation of the power conversion device 10, or when the absolute value Abs(err) of the prediction error err is less than the prescribed threshold), the initial value of the state vector x may be a predetermined constant value. For example, when the distributed power source 6 is the solar panel, etc., the average values of one day's amount of the estimated values ^R, ^X, and ^Vr may be calculated; and the average values of the estimated values ^R, ^X, and ^Vr may be used as the initial value of the state vector x of the next day. The first estimation part 61 may have a function of calculating the average values of the estimated values ^R, ^X, and ^Vr in a prescribed period, and using the calculated average values of the estimated values ^R, ^X, and ^Vr as the initial value of the state vector x of the next prescribed period.

In the predict step, the first estimation part 61 predicts the state vector x and predicts a covariance matrix $P^f$ using the following Formula (7). The covariance matrix $P^f$ is an error covariance matrix of the state vector $x^f$ after the prediction considering the effects of the system noise w.

[Formula 7]
$$P_k^f = J_f(x_{k-1}^a)P_{k-1}J_f(x_{k-1}^a)^T + Q_{k-1} \quad (7)$$

In Formula (7), $J_f(x)$ is a matrix defined by the Jacobian of the nonlinear function f, and in the example, is the diagonal matrix of (1, 1, 1) as represented in the following Formula (8).

[Formula 8]
$$J_f(x_{k-1}^a) = \frac{\partial f(x)}{\partial x} = \text{diag. } (1, 1, 1) \quad (8)$$

In Formula (7), $P_{k-1}$ is the initial value of the covariance matrix or the covariance matrix of one previous. In Formula (7), $J_f(x)^T$ is the transposed matrix of the Jacobian matrix $J_f(x)$. Also, in Formula (7), $Q_{k-1}$ is the covariance matrix of the system noise w. The covariance matrix $Q_{k-1}$ of the system noise w is the expected value of the inner product of the system noise w and the transposed matrix of the system noise w as represented in the following Formula (9).

[Formula 9]
$$E[w_k w_k^T] = Q_k \qquad (9)$$

Based on the estimated values ^R, ^X, and ^Vr calculated in the predict step, the controller 42 operates the major circuit part 40 and acquires the active power value P, the reactive power value Q, and the voltage value Vs when operating the major circuit part 40. The first estimation part 61 performs the update step after the active power value P, the reactive power value Q, and the voltage value Vs are acquired. In the update step, the first estimation part 61 updates the state vector x based on the active power value P, the reactive power value Q, and the voltage value Vs that are acquired.

In the update step, first, the first estimation part 61 optimizes the Kalman gain for updating the state vector x based on the covariance matrix $P^f$ and the acquired measured values of the active power value P, the reactive power value Q, and the voltage value Vs. The Kalman gain is determined by the following Formula (10).

[Formula 10]
$$K_k = P_k^f J_h(x_k^f)^T [J_h(x_k^f) P_k^f J_h(x_k^f)^T + R_k]^{-1} \qquad (10)$$

In Formula (10), $J_h(X)$ is a matrix defined by the Jacobian of the nonlinear function h. In the example, the nonlinear function h(x) is the voltage value Vs of the connection point LP; therefore, $J_h(X)$ is represented by the following Formula (11).

[Formula 11]
$$J_h(x) = \frac{\partial h(x)}{\partial X} = \left(\frac{\partial V_s}{\partial R} \frac{\partial V_s}{\partial X} \frac{\partial V_s}{\partial V_r}\right) \qquad (11)$$

In Formula (11), ∂Vs/∂R, ∂Vs/∂X, and ∂Vs/∂Vr are represented respectively in the following Formula (12), Formula (13), and Formula (14) from Formula (2) above.

[Formula 12]
$$\frac{\partial V_s}{\partial R} = \frac{P}{V_s} + \frac{P}{2V_s\sqrt{B^2 - 4C}}(B - 2(R^2 + X^2)) \qquad (12)$$

[Formula 13]
$$\frac{\partial V_s}{\partial X} = \frac{Q}{V_s} + \frac{Q}{2V_s\sqrt{B^2 - 4C}}(B - 2(R^2 + X^2)) \qquad (13)$$

[Formula 14]
$$\frac{\partial V_s}{\partial V_r} = \frac{V_r}{V_s} + \frac{2V_r B}{4V_s\sqrt{B^2 - 4C}} \qquad (14)$$

It is noted that in Formula (12), Formula (13), and Formula (14), B is the following Formula (15); and C is the following Formula (16).

[Formula 15]
$$B = 2(RP + XQ) + V_r^2 \qquad (15)$$

[Formula 16]
$$C = (P^2 + Q^2)(R^2 + X^2) \qquad (16)$$

Also, in Formula (10) above, $J_h(x)^T$ is the transposed matrix of the Jacobian matrix $J_h(x)$. In Formula (10), $R_k$ is the covariance matrix of the observation noise v. A covariance matrix $R_k$ of the observation noise v is the expected value of the inner product of the observation noise v and the transposed matrix of the observation noise v as represented in the following Formula (17).

[Formula 17]
$$E[v_k v_k^T] = R_k \qquad (17)$$

In Formula (10), the part of $[J_h(x)P^f J_h(x)^T + R_k]^{-1}$ is, in other words, the error covariance for the prediction error $(z_k - h(x_k^f))$ (the prediction error err).

In the update step, after the optimization of the Kalman gain is performed, the first estimation part 61 uses the Kalman gain to update the state vector x using the following Formula (18).

[Formula 18]
$$x_k^a = x_k^f + K_k(z_k - h(x_k^f)) \qquad (18)$$

In Formula (18), $h(x_k^f)$ is the predicted value of the voltage value Vs calculated from the state vector $x_k^f$ after the prediction using Formula (2). In other words, the first estimation part 61 determines the prediction error err of the voltage value Vs of the connection point LP based on the measured value $z_k$ of the voltage value Vs of the connection point LP and the predicted value $h(x_k^f)$ of the voltage value Vs of the connection point LP calculated using the state vector $x_k^f$ after the prediction. The first estimation part 61 determines the prediction error err by subtracting the predicted value $h(x_k^f)$ from the measured value $z_k$ as in the following Formula (19).

[Formula 19]
$$err = z_k - h(x_k^f) \qquad (19)$$

The first estimation part 61 calculates a correction value of the state vector x by multiplying the prediction error err by the Kalman gain, and determines the state vector $x^a$ after the update by adding the correction value to the state vector $x^f$ after the prediction. As a result, the next state vector x can be predicted by considering the prediction error err.

In the update step, the first estimation part 61 updates the state vector x and updates the covariance matrix P using the following Formula (20). As represented in Formula (20), the first estimation part 61 updates the covariance matrix P based on the optimized Kalman gain.

[Formula 20]

$$P_k = [I - K_k J_h(x_k^f)] P_k^f \qquad (20)$$

The first estimation part 61 repeatedly performs the predict step and the update step described above. As a result, the estimated values ^R, ^X, and ^Vr can be predicted using the extended Kalman filter; and the operation of the major circuit part 40 can be controlled based on the prediction. As a result, the fluctuation of the voltage value Vs of the connection point LP can be suppressed by calculating with the extended Kalman filter. In Formula (20), I is the identity matrix.

As described above, for example, the first estimation part 61 inputs the calculated absolute value Abs(err) of the prediction error err to the switching part 63. The switching part 63 determines whether or not the input absolute value Abs(err) of the prediction error err is not less than the prescribed threshold, and switches the state in which the calculation result of the first estimation part 61 is input to the reactive power calculation part 52 to the state in which the calculation result of the second estimation part 62 is input to the reactive power calculation part 52 when the absolute value Abs(err) is determined to be not less than the prescribed threshold.

For example, the determination of whether or not the absolute value Abs(err) of the prediction error err is not less than the prescribed threshold may be performed by the first estimation part 61. For example, the first estimation part 61 may determine whether or not the absolute value Abs(err) of the prediction error err is not less than the prescribed threshold, and may input, to the switching part 63, a signal indicating that the absolute value Abs(err) of the prediction error err is not less than the threshold when determining that the absolute value Abs(err) is not less than the threshold. The switching part 63 may perform the switching of the state according to the signal input from the first estimation part 61. The configuration is not limited to the configuration described above as long as the switching part 63 can recognize whether or not the absolute value Abs(err) of the prediction error err is not less than the prescribed threshold; and any configuration may be used in which the switching part 63 can appropriately recognize whether or not the absolute value Abs(err) is not less than the threshold and switch the states.

Also, the first estimation part 61 resets the previous covariance matrix $P_{k-1}$ to the initial value when, for example, the absolute value Abs(err) of the prediction error err is not less than a prescribed value. The initial value of the covariance matrix is, for example, a covariance matrix having a relatively large value such as diag(200, 200, 200), etc. As a result, the convergence of the covariance matrix $P_{k-1}$ can be faster when the system characteristics change, etc.

The prescribed value for determining the reset of the covariance matrix $P_{k-1}$ may be the same as or different from the threshold for the determination of the switching of the states by the switching part 63. For example, when the absolute value Abs(err) of the prediction error err reaches or exceeds the prescribed threshold (the prescribed value), the switching part 63 may switch the state in which the calculation result of the first estimation part 61 is input to the reactive power calculation part 52 to the state in which the calculation result of the second estimation part 62 is input to the reactive power calculation part 52, and the first estimation part 61 may reset the covariance matrix $P_{k-1}$ to the initial value.

Or, when the absolute value Abs(err) of the prediction error err reaches or exceeds the prescribed threshold (the prescribed value), the first estimation part 61 may reset the covariance matrix $P_{k-1}$ to the initial value, and the calculation of the first estimation part 61 may be switched to the calculation of the second estimation part 62 even after the reset is performed if the absolute value Abs(err) of the prediction error err is not less than the prescribed threshold. The timing of the determination of the switching of the calculation after the reset is performed is, for example, when a prescribed number of sampling points has been performed after the reset was performed.

The prescribed value for determining the reset of the covariance matrix $P_{k-1}$ may be set to be, for example, less than the threshold for the determination of the switching of the states by the switching part 63. For example, when the absolute value Abs(err) of the prediction error err reaches or exceeds the prescribed value, and then the absolute value Abs(err) of the prediction error err is reduced by resetting the covariance matrix $P_{k-1}$, the calculation by the first estimation part 61 is continued. Then, if the absolute value Abs(err) of the prediction error err increases even after the covariance matrix $P_{k-1}$ is reset and the absolute value Abs(err) of the prediction error err reaches or exceeds the prescribed threshold, the calculation of the first estimation part 61 may be switched to the calculation of the second estimation part 62. However, the first estimation part 61 may not always reset the covariance matrix $P_{k-1}$.

The calculation of the estimated values ^R, ^X, and ^Vr by the second estimation part 62 using Newton's method will now be described.

In the second estimation part 62, the function $f_k$ is represented by the following Formula (21).

[Formula 21]

$$f_k(R, X, V_r) = \left(R - \frac{P_k V_{sk}^2}{P_k^2 + Q_k^2}\right)^2 + \left(X - \frac{Q_k V_{sk}^2}{P_k^2 + Q_k^2}\right)^2 - \frac{V_r^2 V_{sk}^2}{P_k^2 + Q_k^2} \qquad (21)$$

The following Formula (22) holds for Newton's method.

[Formula 22]

$$F_{k+1} = F_k + J_k(x_{(k)})(x_{(k+1)} - x_{(k)}) \qquad (22)$$

$F_k$, $J_k$, and $x_k$ are represented by the following Formulas (23) to (25) when k data points are sampled for the active power value P, the reactive power value Q, and the voltage value Vs of the connection point LP.

[Formula 23]

$$F_k = \begin{bmatrix} f_1(R, X, V_r) \\ f_2(R, X, V_r) \\ \vdots \\ f_3(R, X, V_r) \end{bmatrix} \qquad (23)$$

-continued

[Formula 24]
$$J_k = \begin{bmatrix} \frac{\partial f_1}{\partial R} & \frac{\partial f_1}{\partial X} & \frac{\partial f_1}{\partial V_r} \\ \frac{\partial f_2}{\partial R} & \frac{\partial f_2}{\partial X} & \frac{\partial f_2}{\partial V_r} \\ \vdots & \vdots & \vdots \\ \frac{\partial f_3}{\partial R} & \frac{\partial f_3}{\partial X} & \frac{\partial f_3}{\partial V_r} \end{bmatrix} \quad (24)$$

[Formula 25]
$$x_k = \begin{bmatrix} R_k \\ X_k \\ V_{rk} \end{bmatrix} \quad (25)$$

The second estimation part 62 estimates $x_{(k+1)}$ using the following Formula (26).

[Formula 26]
$$0 = F_k + J_k(x_{(k)})(x_{(k+1)} - x_{(k)}) \quad (26)$$

Formula (26) is modified to Formula (27), where the transposed matrix of $J_k$ is represented by $J_k^T$.

[Formula 27]
$$0 = J_k^T F_k + J_k^T J_k(x_{(k)})(x_{(k+1)} - x_{(k)}) \quad (27)$$

When assuming the following Formulas (28) and (29), Formula (27) is modified to Formula (30).

[Formula 28]
$$J_k^T F_k = B_k \quad (28)$$

[Formula 29]
$$J_k^T J_k = A_k \quad (29)$$

[Formula 30]
$$0 = B_k + A_k(x_{(k)})(x_{(k+1)} - x_{(k)}) \quad (30)$$

The second estimation part 62 estimates $x_{(k+1)}$ using Formula (30). More specifically, the second estimation part 62 estimates $x_{(k+1)}$ using the following Formula (31). In other words, the second estimation part 62 calculates the estimated values ^R, ^X, and ^Vr by the convergence calculation of Formula (31).

[Formula 31]
$$x_{(k+1)} = x_{(k)} - A_k^{-1} B_k \quad (31)$$

The second estimation part 62 calculates $F_{(k+1)}$ by substituting $x_{(k+1)}$ (the estimated values ^R, ^X, and ^Vr) repeatedly calculated by Formula (23), Formula (24), Formula (28), Formula (29), and Formula (31) in Formula (23) from Formula (21). The second estimation part 62 determines that the calculation of the estimated values ^R, ^X, and ^Vr using Newton's method has converged when the calculated $F_{norm(k+1)}$ is not more than the prescribed threshold. The norm of $F_{(k+1)}$ is, in other words, the magnitude of $F_{(k+1)}$ (the vector represented by Formula (23) above). For example, when $F_{norm(k+1)}$ is not more than 10-s, the second estimation part 62 determines that the calculation of the estimated values ^R, ^X, and ^Vr using Newton's method has converged, and inputs the convergence results to the switching part 63 as ^$R_n$, ^$X_n$, and ^$Vr_n$. For example, when the active power value P, the reactive power value Q, and the voltage value Vs of the connection point LP are sampled at a prescribed interval, the second estimation part 62 may determine that the calculation of the estimated values ^R, ^X, and ^Vr using Newton's method has converged when the calculation is performed for a prescribed number of data.

For example, the switching part 63 switches the state in which the calculation result of the second estimation part 62 is input to the reactive power calculation part 52 to the state in which the calculation result of the first estimation part 61 is input to the reactive power calculation part 52 according to the input of the convergence result from the second estimation part 62.

For example, the calculation of the estimated values ^R, ^X, and ^Vr using Newton's method of the second estimation part 62 may be determined to have converged when the switching part 63 inputs the calculation result of the second estimation part 62 to the first estimation part 61; the first estimation part 61 performs the calculation using the calculation result of the second estimation part 62 as the estimation initial value, and as a result, the absolute value Abs(err) of the prediction error err calculated by the first estimation part 61 using Formula (19) is less than the prescribed threshold.

For example, the switching part 63 may switch the state in which the calculation result of the first estimation part 61 is input to the reactive power calculation part 52 to the state in which the calculation result of the second estimation part 62 is input to the reactive power calculation part 52 when the absolute value Abs(err) of the prediction error err calculated by the first estimation part 61 reaches or exceeds a first threshold, and switch the state in which the calculation result of the second estimation part 62 is input to the reactive power calculation part 52 to the state in which the calculation result of the first estimation part 61 is input to the reactive power calculation part 52 when the absolute value Abs(err) of the prediction error err calculated by the first estimation part 61 is less than a second threshold.

The second threshold may be the same as or different from the first threshold. For example, the second threshold may be set to be less than the first threshold. For example, this setting can suppress the undesirable case where the state is switched to the state in which the calculation result of the first estimation part 61 is input to the reactive power calculation part 52, after which the threshold is again reached or exceeded, and the state returns to the state in which the calculation result of the second estimation part 62 is input to the reactive power calculation part 52.

Figure 7:
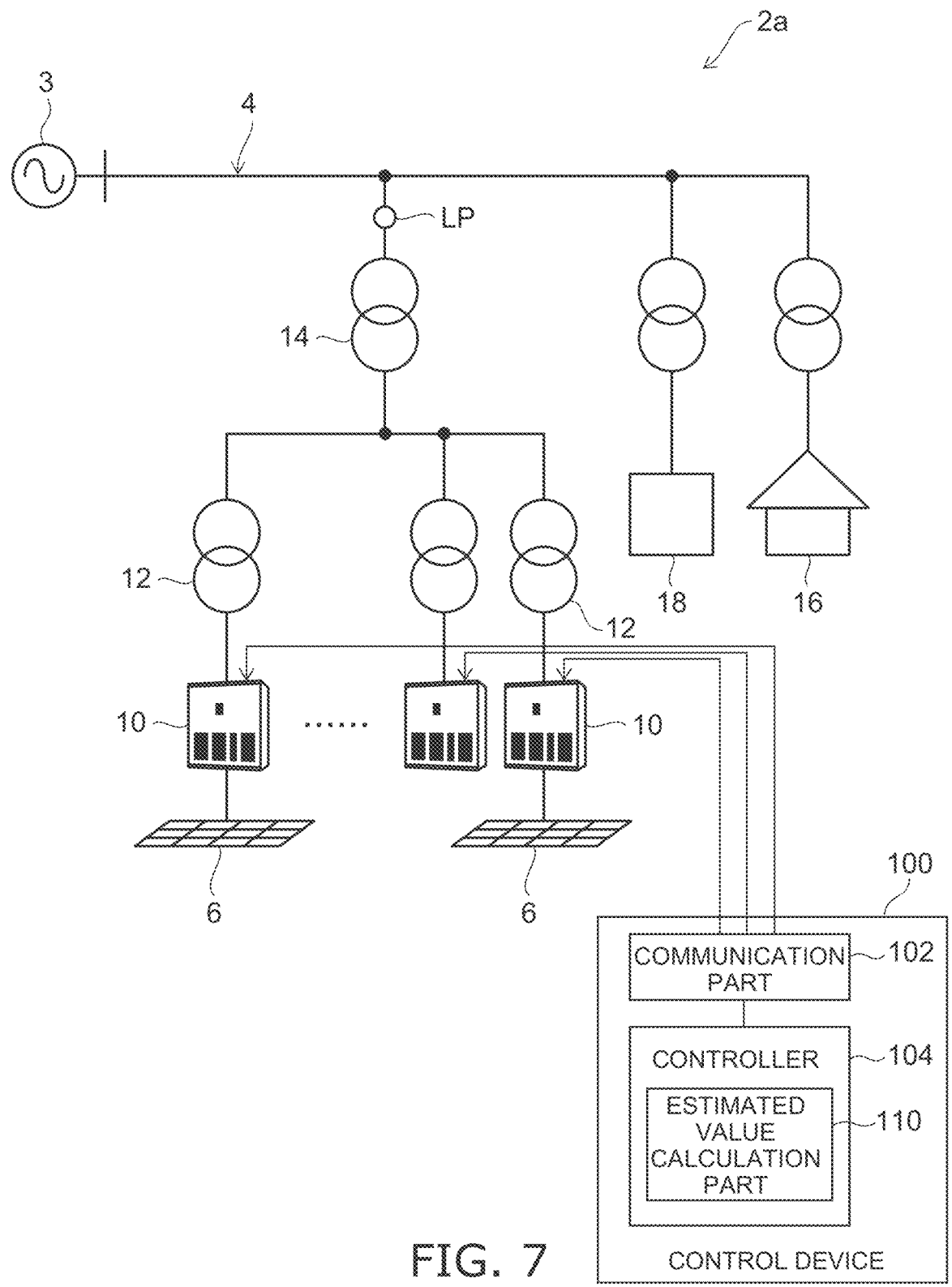
FIG. 7 is a block diagram schematically illustrating a modification of the distributed power source system according to the embodiment.

FIG. 7 is a block diagram schematically illustrating a modification of the distributed power source system according to the embodiment.

As illustrated in FIG. 7, the distributed power source system 2a further includes a control device 100. Components that are substantially the same functionally and configurationally as those of the embodiment described above are marked with the same reference numerals; and a detailed description is omitted.

The control device 100 controls the operations of the multiple power conversion devices 10 provided in the distributed power source system 2a. For example, the control device 100 may be called a main site controller, etc. However, the control device 100 is not limited to multiple power conversion devices 10 and may control the operation of one power conversion device 10.

The control device 100 includes a communication part 102 and a controller 104. The communication part 102 communicates with the power conversion devices 10. For example, the communication part 102 communicates with each of the multiple power conversion devices 10. The communication between the communication part 102 and the power conversion device 10 may be wired or wireless.

The controller 104 includes an estimated value calculation part 110. The controller 104 controls the operations of the power conversion devices 10 so that each power conversion device 10 outputs reactive power corresponding to the estimated values ^R, ^X, and ^Vr calculated by the estimated value calculation part 110.

The configuration of the estimated value calculation part 110 is similar to the configuration of the estimated value calculation part 50 described with reference to the embodiment described above. Similarly to the estimated value calculation part 50, the estimated value calculation part 110 includes the first estimation part 61, the second estimation part 62, and the switching part 63 (not illustrated).

The first estimation part 61 calculates the estimated values ^R, ^X, and ^Vr based on the active power value P, the reactive power value Q, and the voltage value Vs by using a Kalman filter applicable to a nonlinear equation, and calculates the absolute value Abs(err) of the prediction error err of the voltage value Vs of the connection point LP.

The second estimation part 62 calculates the estimated values ^R, ^X, and ^Vr based on the active power value P, the reactive power value Q, and the voltage value Vs by using Newton's method. The switching part 63 selectively switches one of the calculation result of the first estimation part 61 or the calculation result of the second estimation part 62, and outputs the one.

The switching part 63 switches the state in which the calculation result of the first estimation part 61 is output to the state in which the calculation result of the second estimation part 62 is output when the absolute value Abs(err) of the prediction error err reaches or exceeds the prescribed threshold, and returns the state in which the calculation result of the second estimation part 62 is output to the state in which the calculation result of the first estimation part 61 is output when the calculation of the second estimation part 62 using Newton's method converges. The switching part 63 inputs the calculation result of the second estimation part 62 to the first estimation part 61 when switching the state in which the calculation result of the second estimation part 62 is output to the state in which the calculation result of the first estimation part 61 is output. The first estimation part 61 uses the calculation result of the second estimation part 62 as the estimation initial value.

The controller 104 includes, for example, a reactive power calculation part similar to the reactive power calculation part 52 described with reference to the embodiment described above, and controls the operations of the power conversion devices 10 so that each power conversion device 10 outputs reactive power corresponding to the estimated values ^R, ^X, and ^Vr by inputting the reactive power command value calculated by the reactive power calculation part to each power conversion device 10.

For example, the estimated values ^R, ^X, and ^Vr may be input to the power conversion devices 10 from the control device 100; and the calculation of the reactive power may be performed by each power conversion device 10. The control mode in which the operations of the power conversion devices 10 are controlled so that each power conversion device 10 outputs the reactive power corresponding to the estimated values ^R, ^X, and ^Vr may be any mode in which each power conversion device 10 can output the appropriate reactive power corresponding to the estimated values ^R, ^X, and ^Vr.

In the distributed power source system 2a, the estimated value calculation part 50 of the controller 42 of each power conversion device 10 is omissible. Also, when the reactive power calculation part is provided in the controller 104 of the control device 100, the reactive power calculation part 52 of the controller 42 of each power conversion device 10 also is omissible.

Thus, the estimated value calculation part is not limited to the controller 42 of each power conversion device 10; and the controller 104 of the control device 100 that controls the operations of the power conversion devices 10 may be provided. In such a case as well, similarly to the embodiment described above, the system characteristics of the power system 4 can be more appropriately estimated even when a large change of the system characteristics occurs abruptly, and the voltage fluctuation of the connection point LP can be more appropriately suppressed.

Although several embodiments of the invention are described, these embodiments are presented as examples and are not intended to limit the scope of the invention. These novel embodiments may be carried out in other various forms; and various omissions, substitutions, and modifications can be performed without departing from the spirit of the invention. Such embodiments and their modifications are within the scope and spirit of the invention and are included in the invention described in the claims and their equivalents.

REFERENCE SIGNS LIST

2, 2a distributed power source system, 3 infinite bus power system, 4 power system, 6 distributed power source, 10 power conversion device, 12, 14 transformer, 16 consumer, 18 generator, 20, 22 measurement device, 40 major circuit part, 42 controller, 50 estimated value calculation part, 52 reactive power calculation part, 54 drive circuit, 61 first estimation part, 62 second estimation part, 63 switching part, 65 moving average filter, 100 control device, 102 communication part, 104 controller, 110 estimated value calculation part

The invention claimed is:

1. A power conversion device connecting a distributed power source to a power system by converting power of the distributed power source into alternating current power corresponding to the power system and by supplying the alternating current power after the converting to the power system, the power system being connected to an infinite bus power system, the power conversion device comprising:
a major circuit part converting the power of the distributed power source into the alternating current power corresponding to the power system; and
a controller controlling an operation of the major circuit part,
the controller including:
an estimated value calculation part calculating an estimated value of a resistance component of a system impedance of the power system, an estimated value of a reactance component of the system impedance, and an estimated value of a voltage value of the infinite bus power system based on an active power value of a connection point to the power system, a reactive power value of the connection point, and a voltage value of the connection point;

a reactive power calculation part calculating a reactive power command value of reactive power supplied to the power system based on the estimated value of the resistance component of the system impedance, the estimated value of the reactance component of the system impedance, and the estimated value of the voltage value of the infinite bus power system; and a drive circuit driving the major circuit part to output a prescribed active power and reactive power corresponding to the reactive power command value, the estimated value calculation part including:

a first estimation part calculating the estimated value of the resistance component, the estimated value of the reactance component, and the estimated value of the voltage value based on the active power value, the reactive power value, and the voltage value by using a Kalman filter applicable to a nonlinear equation, and calculating an absolute value of a prediction error of the voltage value of the connection point;

a second estimation part calculating the estimated value of the resistance component, the estimated value of the reactance component, and the estimated value of the voltage value based on the active power value, the reactive power value, and the voltage value by using Newton's method; and a switching part selectively switching one of a calculation result of the first estimation part or a calculation result of the second estimation part, and inputting the one to the reactive power calculation part, the switching part:

switching from a state in which the calculation result of the first estimation part is input to the reactive power calculation part to a state in which the calculation result of the second estimation part is input to the reactive power calculation part when the absolute value of the prediction error reaches or exceeds a prescribed threshold; and switching from the state in which the calculation result of the second estimation part is input to the reactive power calculation part to the state in which the calculation result of the first estimation part is input to the reactive power calculation part when the calculation of the second estimation part by Newton's method converges, the first estimation part using the calculation result of the second estimation part as an estimation initial value when starting the calculation of the estimated value of the resistance component, the estimated value of the reactance component, and the estimated value of the voltage value.

2. The power conversion device according to claim 1, wherein the first estimation part uses an extended Kalman filter as the Kalman filter applicable to the nonlinear equation.

3. The power conversion device according to claim 1, wherein the estimated value calculation part includes a moving average filter, the moving average filter calculating moving averages respectively of the active power value, the reactive power value, and the voltage value and inputting, to the second estimation part, the active power value, the reactive power value, and the voltage value after the calculating, and the second estimation part calculates the estimated value of the resistance component, the estimated value of the reactance component, and the estimated value of the voltage value by using Newton's method based on the active power value, the reactive power value, and the voltage value after the calculating of the moving averages input from the moving average filter.

4. A control device controlling an operation of a power conversion device, the power conversion device connecting a distributed power source to a power system by converting power of the distributed power source into alternating current power corresponding to the power system and by supplying the alternating current power after the converting to the power system, the power system being connected to an infinite bus power system, the control device comprising:

a communication part communicating with the power conversion device; and a controller controlling the operation of the power conversion device, the controller including an estimated value calculation part, the estimated value calculation part calculating an estimated value of a resistance component of a system impedance of the power system, an estimated value of a reactance component of the system impedance, and an estimated value of a voltage value of the infinite bus power system based on an active power value of a connection point to the power system, a reactive power value of the connection point, and a voltage value of the connection point, the controller controlling the operation of the power conversion device to cause the power conversion device to output reactive power corresponding to the estimated value of the resistance component, the estimated value of the reactance component, and the estimated value of the voltage value calculated by the estimated value calculation part, the estimated value calculation part including:

a first estimation part calculating the estimated value of the resistance component, the estimated value of the reactance component, and the estimated value of the voltage value based on the active power value, the reactive power value, and the voltage value by using a Kalman filter applicable to a nonlinear equation, and calculating an absolute value of a prediction error of the voltage value of the connection point;

a second estimation part calculating the estimated value of the resistance component, the estimated value of the reactance component, and the estimated value of the voltage value based on the active power value, the reactive power value, and the voltage value by using Newton's method; and a switching part selectively switching one of a calculation result of the first estimation part or a calculation result of the second estimation part, and outputting the one, the switching part:

switching from a state in which the calculation result of the first estimation part is output to a state in which the calculation result of the second estimation part is output when the absolute value of the prediction error reaches or exceeds a prescribed threshold; and switching from the state in which the calculation result of the second estimation part is output to the state in which the calculation result of the first estimation part is output when the calculation of the second estimation part by Newton's method converges, the first estimation part using the calculation result of the second estimation part as an estimation initial value when starting the calculation of the estimated value of the resistance component, the estimated value of the reactance component, and the estimated value of the voltage value.

5. A distributed power source system, comprising:

a distributed power source;

a power conversion device connecting a distributed power source to a power system by converting power of the distributed power source into alternating current power corresponding to the power system and by supplying the alternating current power after the converting to the power system, the power system being connected to an infinite bus power system, the power conversion device including
- a major circuit part converting the power of the distributed power source into the alternating current power corresponding to the power system, and
- a controller controlling an operation of the major circuit part, the controller including
- an estimated value calculation part calculating an estimated value of a resistance component of a system impedance of the power system, an estimated value of a reactance component of the system impedance, and an estimated value of a voltage value of the infinite bus power system based on an active power value of a connection point to the power system, a reactive power value of the connection point, and a voltage value of the connection point,
- a reactive power calculation part calculating a reactive power command value of reactive power supplied to the power system based on the estimated value of the resistance component of the system impedance, the estimated value of the reactance component of the system impedance, and the estimated value of the voltage value of the infinite bus power system, and
- a drive circuit driving the major circuit part to output a prescribed active power and reactive power corresponding to the reactive power command value, the estimated value calculation part including
- a first estimation part calculating the estimated value of the resistance component, the estimated value of the reactance component, and the estimated value of the voltage value based on the active power value, the reactive power value, and the voltage value by using a Kalman filter applicable to a nonlinear equation, and calculating an absolute value of a prediction error of the voltage value of the connection point,
- a second estimation part calculating the estimated value of the resistance component, the estimated value of the reactance component, and the estimated value of the voltage value based on the active power value, the reactive power value, and the voltage value by using Newton's method, and
- a switching part selectively switching between one of a calculation result of the first estimation part and a calculation result of the second estimation part, and inputting the one to the reactive power calculation part, the switching part
- switching from a state in which the calculation result of the first estimation part is input to the reactive power calculation part to a state in which the calculation result of the second estimation part is input to the reactive power calculation part when the absolute value of the prediction error reaches or exceeds a prescribed threshold, and
- switching from the state in which the calculation result of the second estimation part is input to the reactive power calculation part to the state in which the calculation result of the first estimation part is input to the reactive power calculation part when the calculation of the second estimation part by Newton's method converges, the first estimation part using the calculation result of the second estimation part as an estimation initial value when starting the calculation of the estimated value of the resistance component, the estimated value of the reactance component, and the estimated value of the voltage value.

* * * * *